(12) United States Patent
Ohata (10) Patent No.: US 10,233,294 B2
(45) Date of Patent: *Mar. 19, 2019

(54) TREATED LIQUID CRYSTAL POLYMER POWDERS, PASTE CONTAINING THE SAME, AND LIQUID CRYSTAL POLYMER SHEET INCLUDING THE FORMER, STACK, AND METHOD OF MANUFACTURING TREATED LIQUID CRYSTAL POLYMER POWDERS

(71) Applicant: Murata Manufacturing Co., Ltd., Kyoto (JP)

(72) Inventor: Hiroyuki Ohata, Kyoto (JP)

(73) Assignee: MURATA MANUFACTURING CO., LTD., Kyoto-Fu (JP)

( * ) Notice: Subject to any disclaimer, the term of this patent is extended or adjusted under 35 U.S.C. 154(b) by 49 days.

This patent is subject to a terminal disclaimer.

(21) Appl. No.: 14/755,052

(22) Filed: Jun. 30, 2015

(65) Prior Publication Data

US 2015/0299405 A1 Oct. 22, 2015

Related U.S. Application Data

(63) Continuation of application No. PCT/JP2013/084046, filed on Dec. 19, 2013.

(30) Foreign Application Priority Data

Jan. 9, 2013 (JP) .................................. 2013-001943

(51) Int. Cl.
*C09K 19/38* (2006.01)
*C08J 3/28* (2006.01)

(52) U.S. Cl.
CPC ................ *C08J 3/28* (2013.01); *C09K 19/38* (2013.01); *C08J 2300/00* (2013.01); *C08J 2367/00* (2013.01)

(58) Field of Classification Search
CPC .............. C09K 19/38; C08J 3/122; C08J 3/28
See application file for complete search history.

(56) References Cited

U.S. PATENT DOCUMENTS 4,616,779 A 10/1986 Serrano
5,529,740 A 6/1996 Jester
(Continued)

FOREIGN PATENT DOCUMENTS

CN 102056425 A 5/2011
CN 102206352 A 10/2011
(Continued)

OTHER PUBLICATIONS

International Search Report issued in Application No. PCT/JP2013/084046 dated Feb. 25, 2014.
(Continued)

*Primary Examiner* — Chanceity N Robinson
(74) *Attorney, Agent, or Firm* — Pearne & Gordon LLP (57) ABSTRACT

Treated liquid crystal polymer powders have been subjected to surface treatment with plasma or ultra violet rays, a paste including the treated liquid crystal polymer powders and a dispersion medium, a liquid crystal polymer sheet comprising the treated liquid crystal polymer powders or the paste including the treated liquid crystal polymer powders and a dispersion medium into a sheet, a stack including the liquid crystal polymer sheet as a resin layer, and a method of manufacturing the treated liquid crystal polymer powders are provided by the present disclosure.

18 Claims, 10 Drawing Sheets

(56) References Cited

U.S. PATENT DOCUMENTS

| | | | |
|---|---|---|---|
| 5,703,202 A | | 12/1997 | Jester |
| 7,094,359 B2 | | 8/2006 | Okamoto |
| 9,532,447 B2 | * | 12/2016 | Ohata .................... C09K 19/38 |
| 2002/0172021 A1 | * | 11/2002 | Seri ................... H01L 23/49894 |
| | | | 361/760 |
| 2003/0010376 A1 | * | 1/2003 | Yamaguchi et al. |
| 2007/0012657 A1 | * | 1/2007 | O'Donnell ........ H01J 37/32467 |
| | | | 216/23 |
| 2008/0048150 A1 | | 2/2008 | Hosoda |
| 2011/0240353 A1 | * | 10/2011 | Kohinata ............. C08G 63/605 |
| | | | 174/258 |
| 2014/0030471 A1 | | 1/2014 | Otsubo |
| 2015/0294754 A1 | * | 10/2015 | Ohata ........................ C08J 3/12 |
| | | | 428/195.1 |
| 2015/0305150 A1 | * | 10/2015 | Ohata .................... C09K 19/38 |
| | | | 428/201 |

FOREIGN PATENT DOCUMENTS

| | | |
|---|---|---|
| JP | S63-245445 A | 10/1888 |
| JP | S60-44038 A | 3/1985 |
| JP | 05-2911 U | 1/1993 |
| JP | H06-184466 A | 7/1994 |
| JP | H08-90570 A | 4/1996 |
| JP | 2003-268121 A | 9/2003 |
| JP | 2004-323593 A | 11/2004 |
| JP | 2004-352937 A | 12/2004 |
| JP | 2005-135736 A | 5/2005 |
| JP | 2007-262168 A | 10/2007 |
| JP | 2008-075063 A | 4/2008 |
| JP | 2010-149411 A | 7/2010 |
| JP | 2011-006629 A | 1/2011 |
| WO | 89/10208 A1 | 11/1989 |
| WO | 2012/137626 A1 | 10/2012 |

OTHER PUBLICATIONS

Written Opinion issued in Application No. PCT/JP2013/084046 dated Feb. 25, 2014.
Notice of Grounds of Rejection issued in corresponding Japanese Patent Application No. 2014-556359 dated Nov. 10, 2015.
Second Office Action issued in Chinese Patent Application No. 201380067587 dated Jun. 1, 2017.
Notification of the First Office Action issued in Chinese Patent Application No. 201380069379 dated Apr. 1, 2017.

* cited by examiner

TREATED LIQUID CRYSTAL POLYMER POWDERS, PASTE CONTAINING THE SAME, AND LIQUID CRYSTAL POLYMER SHEET INCLUDING THE FORMER, STACK, AND METHOD OF MANUFACTURING TREATED LIQUID CRYSTAL POLYMER POWDERS

BACKGROUND

Technical Field

The present disclosure relates to treated liquid crystal polymer powders, a paste containing the same, and a liquid crystal polymer sheet including the former, a stack, and a method of manufacturing treated liquid crystal polymer powders.

Background Art

A resin called a "liquid crystal polymer" is also known as "liquid crystal polyester" and is commonly abbreviated as "LCP".

Japanese Patent Laying-Open No. 2003-268121 (PTD 1) describes use of an LCP as being pulverized into micropowders for an electrostatic powdery paint or an insulating organic filler.

Japanese Patent Laying-Open No. 2008-75063 (PTD 2), Japanese Patent Laying-Open No. 2010-149411 (PTD 3), and Japanese Patent Laying-Open No. 2011-6629 (PTD 4) describe press forming a formulation of a filler and powders obtained by pulverization of an LCP.
PTD 1: Japanese Patent Laying-Open No. 2003-268121
PTD 2: Japanese Patent Laying-Open No. 2008-75063
PTD 3: Japanese Patent Laying-Open No. 2010-149411
PTD 4: Japanese Patent Laying-Open No. 2011-6629

SUMMARY

Technical Problem

In press forming a formulation of a filler and powders obtained by pulverization of an LCP, bonding between particles is insufficient when a temperature for processing is low. Therefore, a processing start temperature is set such that a resin of the LCP is molten or considerably softened and particles are bonded to each other. Therefore, the processing start temperature is set to such a temperature condition as −10° C. to +100° C. relative to a flow start temperature of the LCP. When a pressure is applied under this temperature condition, however, the pressure is applied with the LCP being molten or considerably softened, and consequently undesired flow takes place.

By using the LCP in a form of varnish by dissolving the LCP in a solvent or in a form of powders resulting from pulverization of the LCP, the LCP can be applied to a desired region of a base material such as a sheet with the use of a printing technique. For an LCP to be used in a form of varnish, however, such a special LCP that amide bond has been introduced in a molecular structure and molecules are packed at a relatively low density has to be employed in order to obtain solubility in a general solvent while characteristics as liquid crystals are maintained. An LCP having such bonds and structure is low in gas barrier capability and high in hygroscopicity, which will adversely affect low water absorbability representing one of primary advantageous for use of the LCP as a part of a base material. Though a common LCP can also be dissolved in a special solvent such as halogen-substituted phenol, in this case, the solvent is expensive, handling gives rise to a problem, and a sheet to which varnish is applied is also dissolved in a case of application to a sheet, in particular, a sheet of an LCP.

In a case that formation of a layer of an LCP on a surface of a base material is attempted with the use of LCP powders as well, under a temperature condition in which powders are completely fused, a melting point of the LCP is exceeded and the entire base material significantly deforms. As a result, a laminating press needs to be carried out at a temperature lower than the melting point, resulting in insufficient adhesion between powder particles or between powders and a base material, and an integrated structure cannot be obtained.

Therefore, the present disclosure provides powders substantially free from such a disadvantage as undesired flow, deformation, or insufficient bonding strength.

Solution to Problem

In order to achieve the object above, treated liquid crystal polymer powders based on the present disclosure have been subjected to surface treatment with plasma or ultra violet rays.

Advantageous Effects

According to the present disclosure, since surface treatment with plasma or ultra violet rays is carried out, bonding strength is improved and a disadvantage originating from undesired flow, deformation, or insufficient bonding strength can substantially be overcome.

DESCRIPTION OF EMBODIMENTS

In the following, "untreated liquid crystal polymer powders" are simply referred to as "LCP powders" and "treated liquid crystal polymer powders" are referred to as "treated LCP powders."

(First Embodiment)

Figure 1:
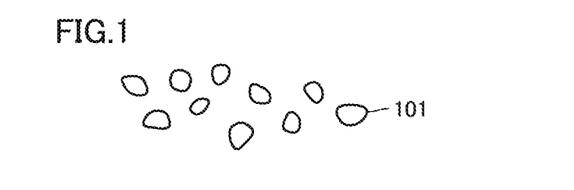
FIG. 1 is a conceptual diagram of treated LCP powders in a first embodiment based on the present disclosure.
Figure 2:
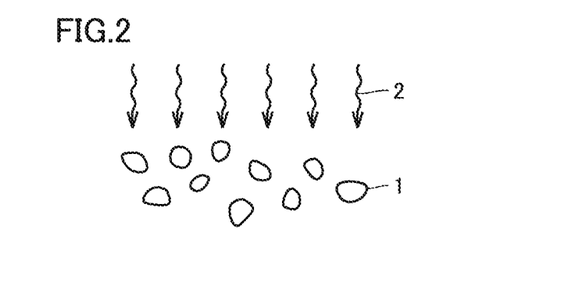
FIG. 2 is an illustrative diagram of irradiation, with plasma, of the treated LCP powders in the first embodiment based on the present disclosure.
Figure 3:
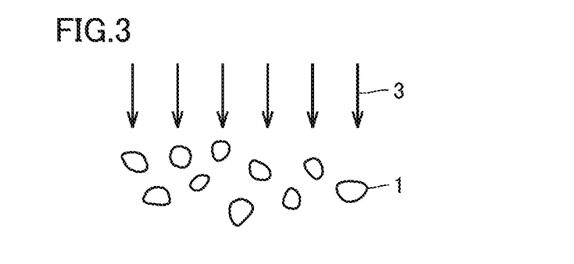
FIG. 3 is an illustrative diagram of irradiation, with ultra violet rays, of the treated LCP powders in the first embodiment based on the present disclosure.

Treated LCP powders in a first embodiment based on the present disclosure will be described with reference to FIGS. 1 to 3. The treated LCP powders in the present embodiment are treated LCP powders 101 subjected to surface treatment with plasma or ultra violet rays as shown in an enlarged manner in FIG. 1. Treated LCP powders 101 are obtained basically through surface treatment by at least any one of irradiation of LCP powders 1 with plasma 2 as shown in FIG. 2 or irradiation of LCP powders 1 with ultra violet rays 3 as shown in FIG. 3. Through such surface treatment, surfaces of LCP powders 1 are altered and treated LCP powders 101 are obtained.

Since treated LCP powders 101 in the present embodiment have been subjected to surface treatment with plasma or ultra violet rays, they have improved bonding strength although a material thereof is an LCP. Since bonding strength between particles is high, particles can adhere to each other without increase in temperature to a melting point or higher of the LCP.

Bonding strength between particles has been enhanced in treated LCP powders 101. Therefore, when a film is formed by applying treated LCP powders 101, strength of the film is enhanced. Not only bonding between LCP particles is facilitated, but bonding, for example, between an LCP substrate and LCP particles can also be facilitated. Therefore, when a film is formed by applying treated LCP powders onto a surface of an LCP substrate, strength of bonding between the film and the LCP substrate is increased.

Since bonding strength between particles has been enhanced in treated LCP powders 101, powder molding can be carried out as they are without treated LCP powders necessarily being dispersed in a dispersion medium. In injection molding, creation of a boundary, known as a weld line, between flows of a molten resin gives rise to a problem. In powder molding, however, no weld line is created and satisfactory molding can be carried out.

As set forth above, according to the treated LCP powders in the present embodiment, a disadvantage originating from undesired flow, deformation, or insufficient bonding strength can be overcome.

(Second Embodiment)

Figure 4:
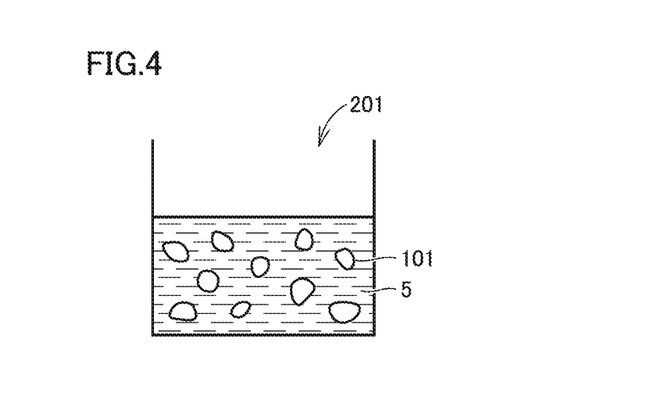
FIG. 4 is a conceptual diagram of a paste in a second embodiment based on the present disclosure.

A paste in a second embodiment based on the present disclosure will be described with reference to FIG. 4. A paste 201 in the present embodiment is a paste containing treated LCP powders 101 described above and a dispersion medium 5. Namely, paste 201 is obtained by mixing treated LCP powders 101 subjected to surface treatment as described in the first embodiment with dispersion medium 5 and kneading the mixture.

In the present embodiment, since a paste is fabricated by using treated LCP powders 101 of which bonding strength has been enhanced by surface treatment with plasma or ultra violet rays, the paste has enhanced adhesive force. In particular, as compared with treated LCP powders 101 as they are, the treated LCP powders have been prepared as a paste, which facilitates handling and an operation.

For example, ethanol, terpineol, butyrolactone, or isopropyl alcohol can be employed as dispersion medium 5.

(Experimental Example 1)

An example in which treated LCP powders based on the present disclosure were fabricated and performance thereof was measured will be described below. What was used is as follows.

LCP Powders: Collection of powders which have passed through a 400-μm mesh sieve, the powders having been obtained by freezing and pulverizing an LCP film having a thickness of 50 μm Film as Base Material: A square LCP film having a thickness of 125 μm and a size of 150 mm×150 mm Dispersion Medium: Ethanol The LCP powders prepared as described above were introduced into a beaker containing pure water to such an extent as covering a water surface. Then, surface treatment was carried out with the use of a powder plasma treatment apparatus manufactured by Sakigake Semiconductor Co., Ltd., until the LCP powders were inmixed with and dispersed in water. The powder plasma treatment apparatus above is a dielectric barrier discharge plasma apparatus which performs plasma treatment at an atmospheric pressure in a liquid and employs water as a dielectric. Thus, a dispersion liquid of treated LCP powders was obtained.

The treated LCP powders were recovered by filtration from the dispersion liquid of the treated LCP powders and dried.

Then, a paste was fabricated by mixing the treated LCP powders and the dispersion medium at a ratio of 1:2 and then kneading the mixture.

A plurality of films as a base material were prepared. A surface of each base material to be bonded was subjected to necessary surface treatment as appropriate. The paste described above was applied to a thickness of 80 μm onto a surface to be bonded of one of these base materials (hereinafter referred to as a "first base material") with a screen printing method.

Figure 5:
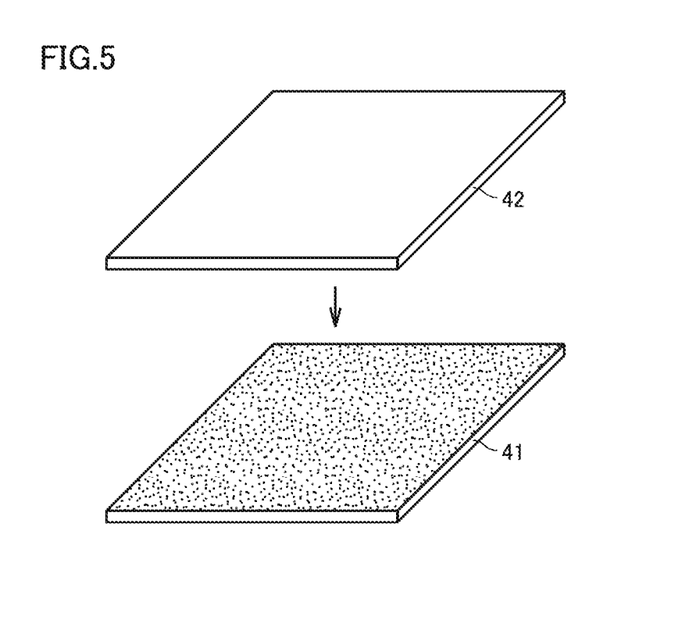
FIG. 5 is a first illustrative diagram of a sample fabrication operation in a first experimental example shown in the second embodiment based on the present disclosure.

The first base material to which the paste was applied was dried by being heated at 80° C. on a hot plate for 1 minute. The surface to which the paste was applied and which was thus dried is hereinafter called a "paste application surface." As shown in FIG. 5, a film 42 as another base material (hereinafter referred to as a "second base material") was layered on the paste application surface of first base material 41. Here, the film is layered such that a surface of second base material 42 to be bonded is in contact with the paste application surface of first base material 41. Though an upper surface of first base material 41 is defined as the paste application surface in FIG. 5, no paste was applied to a lower surface of second base material 42.

Figure 6:
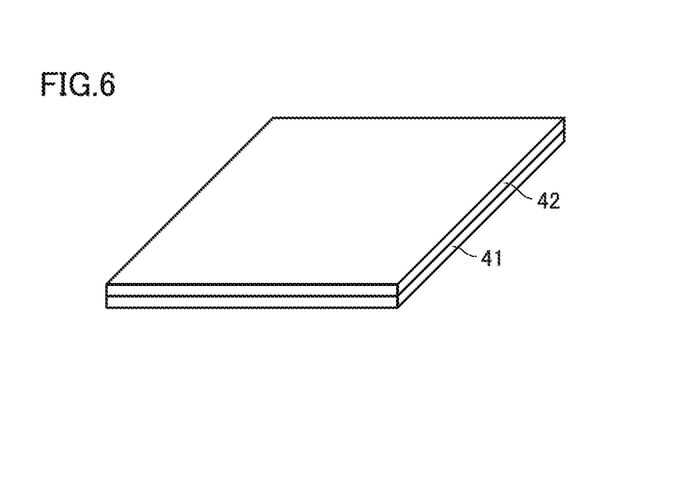
FIG. 6 is a second illustrative diagram of the sample fabrication operation in the first experimental example shown in the second embodiment based on the present disclosure.

A product in which the first base material and the second base material were thus layered was subjected to press working Conditions for this press working were set to 280° C., 6 MPa, and 10 minutes. Thus, as shown in FIG. 6, first base material 41 and second base material 42 were bonded to each other. A layer formed of the previously applied paste is sandwiched between bonding surfaces.

Figure 7:
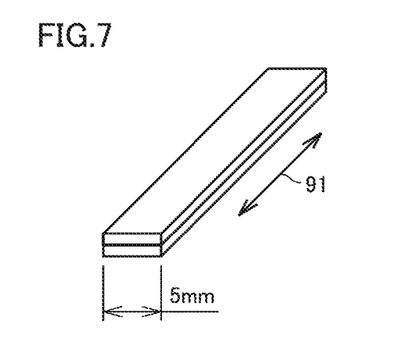
FIG. 7 is a third illustrative diagram of the sample fabrication operation in the first experimental example shown in the second embodiment based on the present disclosure.

Then, as shown in FIG. 7, the bonded base materials were cut into strips having a width of 5 mm. Here, a longitudinal direction 91 of the strip coincided with a direction of pulling at the time when a film as a base material was originally formed.

Figure 8:
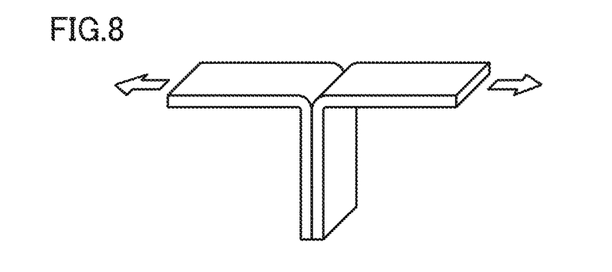
FIG. 8 is an illustrative diagram of a T-peel test in the first experimental example shown in the second embodiment based on the present disclosure.

The bonded object in a strip shape shown in FIG. 7 was subjected to a T-peel test. The T-peel test is conducted by peeling as shown in FIG. 8, and it aims to find T-peel strength from magnitude of necessary force. Here, peeling is continued at a speed condition of an average speed of 50 mm/minute, and necessary force was measured. A value obtained by dividing obtained magnitude of force by a width of this strip, that is, 5 mm, represents T-peel strength.

In addition to a case of surface treatment with plasma on LCP powders as described above, a sample in a strip shape was similarly fabricated also for a case that no surface treatment was carried out, and a T-peel test was conducted. A sample for the case without surface treatment was obtained by preparing a paste with LCP powders not subjected to surface treatment, applying the paste onto first base material 41, and bonding first base material 41 to second base material 42.

Figure 9:
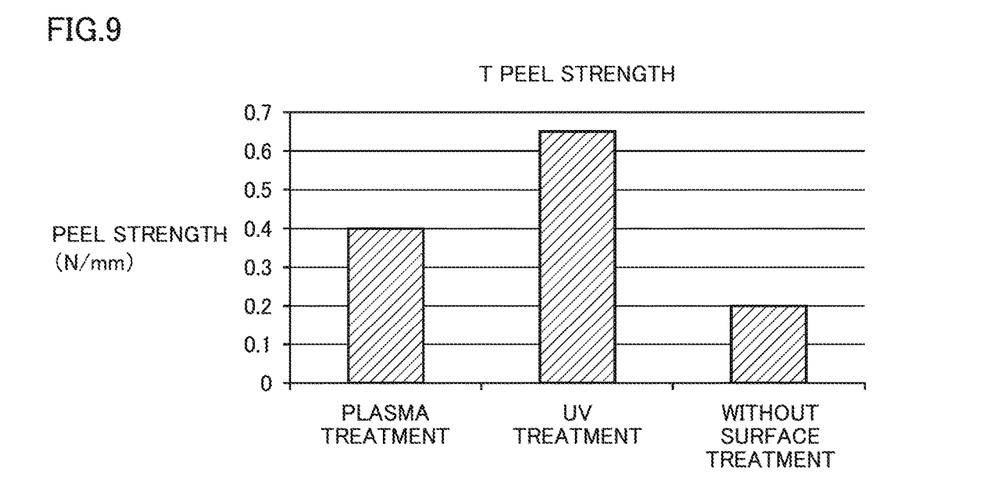
FIG. 9 is a graph showing results in the T-peel test in the first experimental example shown in the second embodiment based on the present disclosure.

FIG. 9 shows results in the T-peel test of each sample. It was found from these results that T-peel strength was higher in the case of surface treatment with plasma than the case without surface treatment. Improvement in T-peel strength is nothing but improvement in bonding strength between films.

(Third Embodiment)

Figure 10:
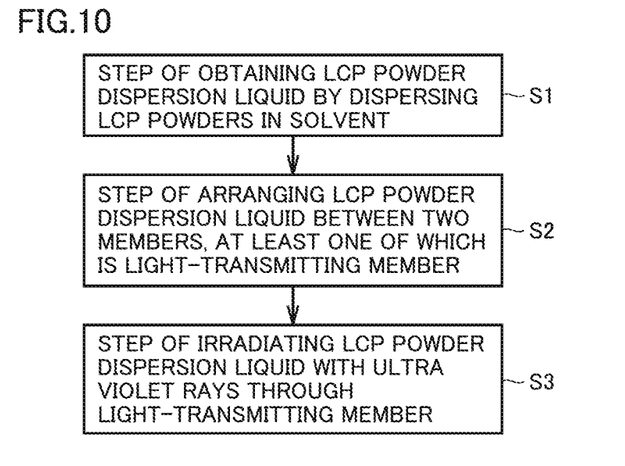
FIG. 10 is a flowchart of a method of manufacturing treated LCP powders in a third embodiment based on the present disclosure.

A method of manufacturing treated LCP powders in a third embodiment based on the present disclosure will be described with reference to FIGS. 10 to 15. FIG. 10 shows a flowchart of the method of manufacturing treated LCP powders in the present embodiment. The method of manufacturing treated LCP powders includes a step S1 of obtaining an LCP powder dispersion liquid by dispersing LCP powders in a dispersion medium, a step S2 of arranging the LCP powder dispersion liquid between two members, at least one of which is a light-transmitting member, and a step S3 of irradiating the LCP powder dispersion liquid with ultra violet rays through the light-transmitting member. The steps S1, S2, and S3 are performed in this order. In a first example shown in the present embodiment, the "two members" as referred to in the step S2 are two plates in parallel to each other. Each step will be described below in detail.

Figure 11:
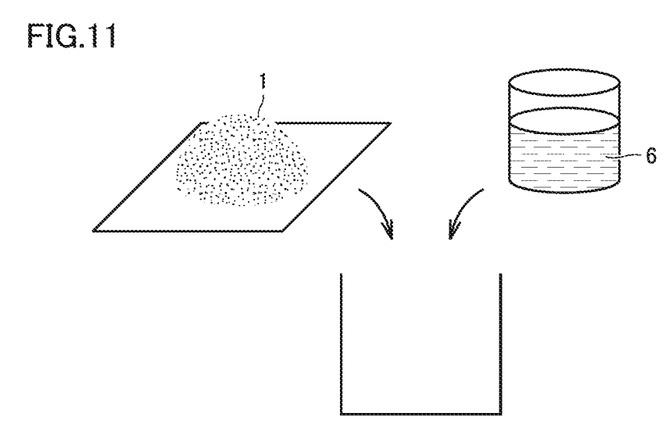
FIG. 11 is an illustrative diagram of a first step in the method of manufacturing treated LCP powders in the third embodiment based on the present disclosure.
Figure 12:
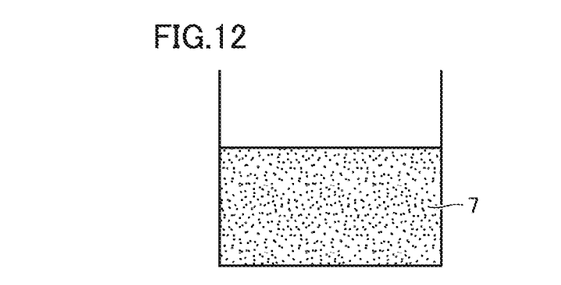
FIG. 12 is a conceptual diagram of an LCP powder dispersion liquid obtained in the first step in the method of manufacturing treated LCP powders in the third embodiment based on the present disclosure.

In the step S1, LCP powders 1 are dispersed in a dispersion medium 6 as shown in FIG. 11, and an LCP powder dispersion liquid 7 is obtained as shown in FIG. 12.

Dispersion medium 5 shown in the second embodiment serves to prepare a paste by dispersing treated LCP powders and to use the paste. In contrast, dispersion medium 6 in the present embodiment serves to temporarily disperse LCP powders for surface treatment of LCP powders with ultra violet rays. Though dispersion medium 6 may be a liquid that is the same in type as dispersion medium 5, it may be a liquid of a different type.

Figure 13:
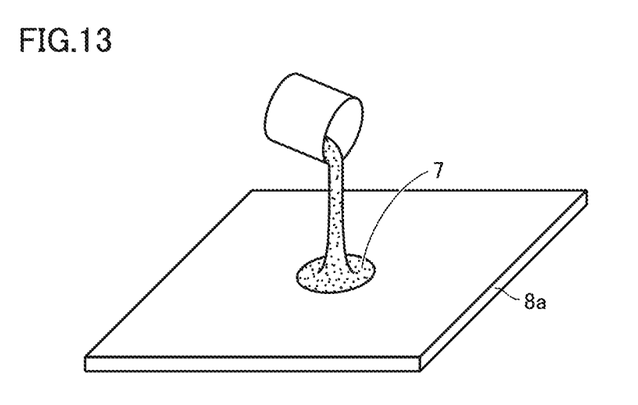
FIG. 13 is a first illustrative diagram of a second step in the method of manufacturing treated LCP powders in the third embodiment based on the present disclosure.
Figure 14:
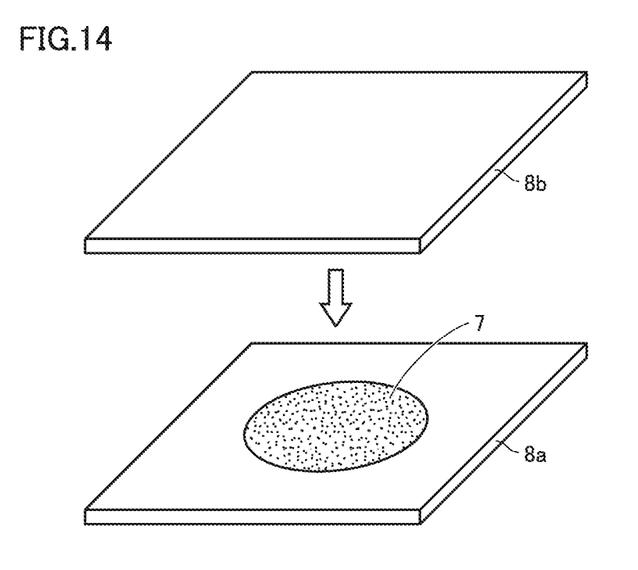
FIG. 14 is a second illustrative diagram of the second step in the method of manufacturing treated LCP powders in the third embodiment based on the present disclosure.
Figure 15:
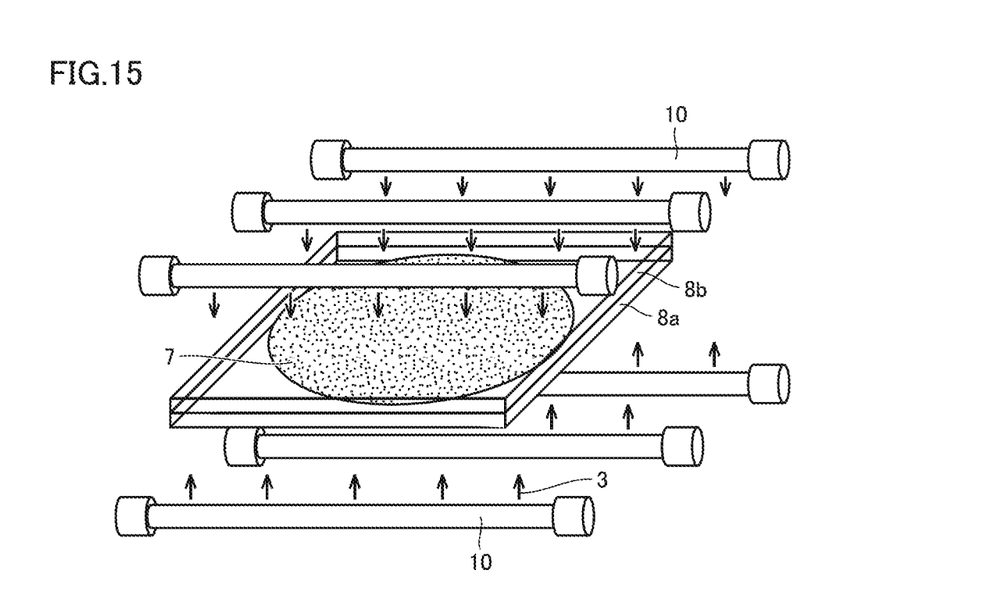
FIG. 15 is an illustrative diagram of a third step in the method of manufacturing treated LCP powders in the third embodiment based on the present disclosure.

In the step S2, an operation is performed, for example, in a procedure shown below. Plates 8a and 8b shown in FIGS. 13 to 15 are flat. LCP powder dispersion liquid 7 is dropped onto plate 8a as shown in FIG. 13. As shown in FIG. 14, plate 8b is placed from above over an upper surface of plate 8a carrying LCP powder dispersion liquid 7. Both or any one of plates 8a and 8b are/is a light-transmitting plate. The light-transmitting plate herein may be a quartz plate. When a light-transmitting plate is a quartz plate, loss of light at the time when ultra violet rays pass can be suppressed. A light-transmitting plate which can sufficiently allow ultra violet rays at a wavelength of 254 nm to pass may be employed as a light-transmitting plate. Further, a light-transmitting plate which allows also ultra violet rays at a wavelength of 185 nm in addition to the wavelength of 254 nm to pass may be employed as the light-transmitting plate. Here, description is continued, assuming that both of plates 8a and 8b are quartz plates. Since LCP powder dispersion liquid 7 is sandwiched between plates 8a and 8b, it is held therebetween as spreading to a very small thickness.

In the step S3, as shown in FIG. 15, LCP powder dispersion liquid 7 sandwiched between plates 8a and 8b is irradiated with ultra violet rays 3 from an ultra violet light source 10. Here, since both of plates 8a and 8b are quartz plates and allow light to pass therethrough, ultra violet light source 10 is arranged on opposing sides of plates 8a and 8b. The step S3 of irradiation with ultra violet rays 3 may be performed by emitting ultra violet rays 3 from a low-pressure mercury lamp or an excimer lamp. In the present embodiment, a low-pressure mercury lamp was employed as ultra violet light source 10. LCP powders contained in LCP powder dispersion liquid 7 in this step S3 change to "treated LCP powders" subjected to surface treatment with ultra violet rays.

After the step S3, LCP powder dispersion liquid 7 sandwiched between plates 8a and 8b is recovered. At this time point, LCP powder dispersion liquid 7 contains treated LCP powders 101. As necessary, treated LCP powders 101 are recovered from LCP powder dispersion liquid 7. Treated LCP powders 101 can be recovered from LCP powder dispersion liquid 7 by filtration and drying.

Since the LCP powder dispersion liquid is irradiated with ultra violet rays while the LCP powder dispersion liquid is arranged between two plates in parallel to each other in the present embodiment, uniform irradiation with ultra violet rays as a whole can be achieved. Therefore, uniform improvement in bonding strength of LCP powders as a whole can be achieved.

Though both of plates 8*a* and 8*b* are light-transmitting plates in the example shown in FIG. 15, one of them may be a light-transmitting plate and the other may be a non-light-transmitting plate. In that case, ultra violet light source 10 may be arranged only on a side of the light-transmitting plate. In that case, LCP powder dispersion liquid 7 sandwiched between two plates is irradiated with ultra violet rays only from one side.

Though one example of the step S3 has been described with reference to FIG. 15 above, a light-transmitting member other than the light-transmitting plate as shown in FIG. 15 can also be employed in the step S3. For example, as shown in FIG. 16, treatment can be carried out also by emitting ultra violet rays through a light-transmitting tubular body.

In this example, in performing the step S3, an inner pipe 51 and an outer pipe 52 are employed. Inner pipe 51 is a light-transmitting tubular body. Inner pipe 51 is formed of quartz. Inner pipe 51 is tubular in an intermediate portion and has one end closed. In the example shown in FIG. 16, an end where inner pipe 51 is closed is hemispherical. Speaking in terms of a vertical direction, inner pipe 51 has a lower end closed and has an upper end as an opening 51*c*. Outer pipe 52 has an opening 52*c* at an upper end. Outer pipe 52 has a supply port 52*a* facing sideward, in a lower portion of an outer circumferential surface. Outer pipe 52 has an exhaust port 52*b* facing sideward, in an upper portion of the outer circumferential surface. As shown in FIG. 16, inner pipe 51 is inserted into outer pipe 52 through opening 52*c*. Ultra violet light source 10 in a rod shape is inserted into inner pipe 51 composed of quartz through opening 51*c*. Opening 52*c* of outer pipe 52 is closed by a lid member 53. Lid member 53 has a through hole in its center. FIG. 17 shows an assembled state. A shape and a position of supply port 52*a* and exhaust port 52*b*, and the number of supply ports 52*a* and exhaust ports 52*b* shown in FIGS. 16 and 17 are merely by way of example, and they are not necessarily as shown.

Inner pipe 51 and outer pipe 52 form an ultra violet ray irradiation apparatus having a dual-pipe structure. LCP powder dispersion liquid 7 is fed into a gap between inner pipe 51 and outer pipe 52. LCP powder dispersion liquid 7 is supplied into outer pipe 52 through supply port 52*a* and exhausted from exhaust port 52*b*. Ultra violet light source 10 is arranged in inner pipe 51 representing the light-transmitting member, and ultra violet light emitted from ultra violet light source 10 is incident on LCP powder dispersion liquid 7 through inner pipe 51.

Figure 16:
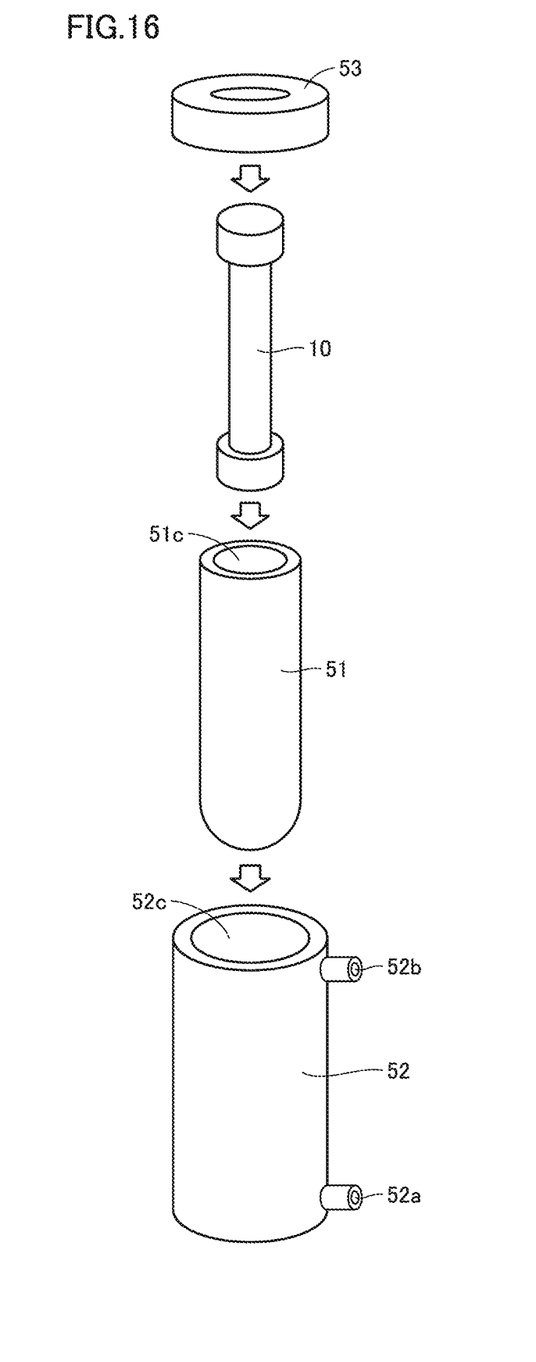
FIG. 16 is a first illustrative diagram of a modification of the third step in the method of manufacturing treated LCP powders in the third embodiment based on the present disclosure.
Figure 17:
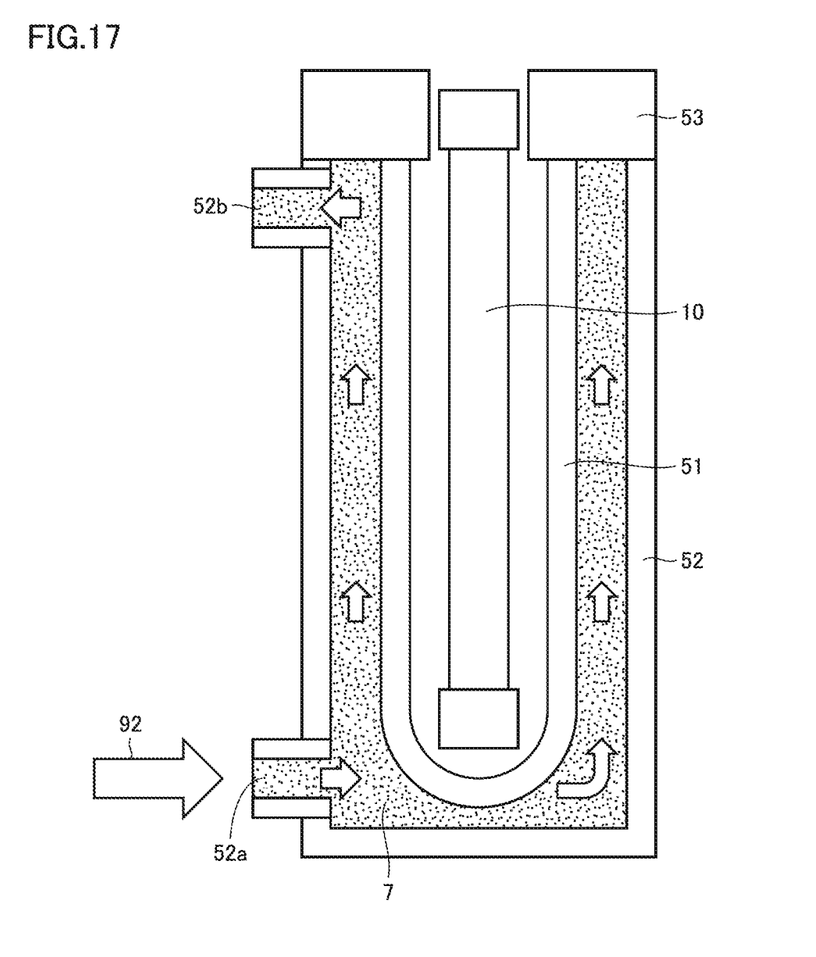
FIG. 17 is a second illustrative diagram of the modification of the third step in the method of manufacturing treated LCP powders in the third embodiment based on the present disclosure.

With the method shown in FIGS. 16 and 17, outer pipe 52 and inner pipe 51 are concentrically arranged so that a distance between a wall of outer pipe 52 and a wall of inner pipe 51 is constant and homogenous ultra violet ray irradiation treatment on LCP powder dispersion liquid 7 can be realized.

When the step S3 is performed with the method as shown in FIG. 15, ultra violet light source 10 emits ultra violet rays in all directions, and hence most of ultra violet rays does not contribute to the present treatment but is lost. In the ultra violet ray irradiation apparatus shown in FIG. 17, on the other hand, ultra violet light source 10 is provided at a position substantially covered with the LCP powder dispersion liquid, and hence ultra violet rays emitted from ultra violet light source 10 are absorbed in LCP powder dispersion liquid 7 substantially without leakage and loss of energy is minimized. The present inventors have verified through empirical testing that, with the method shown in FIG. 17, approximately 80% of energy (i.e., electric power) could be reduced as compared with the ultra violet ray irradiation method shown in FIG. 15.

The method of manufacturing treated liquid crystal polymer powders in the case that the step S3 is performed with the method shown in FIGS. 16 and 17 can be expressed as being summarized as follows.

The method of manufacturing treated liquid crystal polymer powders herein includes the steps of obtaining a liquid crystal polymer powder dispersion liquid by dispersing liquid crystal polymer powders in a dispersion medium, arranging the liquid crystal polymer powder dispersion liquid between the outer pipe and the inner pipe which is arranged in the outer pipe and formed from a light-transmitting member, and irradiating the liquid crystal polymer powder dispersion liquid with ultra violet rays through the inner pipe from the inside of the inner pipe.

(Second Experimental Example)

An example in which the method of manufacturing treated LCP powders in the present embodiment was carried out will be described below.

A liquid obtained by mixing ethanol and pure water at a ratio of 1:1 was prepared, which will be referred to as a "liquid mixture" below. The liquid mixture corresponds to dispersion medium 6 in FIG. 11. In the step S1, an LCP powder dispersion liquid was obtained by mixing LCP powders at a ratio of LCP powders:liquid mixture=1:2. This dispersion liquid corresponds to LCP powder dispersion liquid 7 in FIG. 12.

In the step S2, two synthesized quartz plates having a size of 250 mm×250 mm and a thickness of 4 mm were prepared as plates 8*a* and 8*b* in FIGS. 14, and 10 ml of the LCP powder dispersion liquid was dropped onto one of them and sandwiched as being covered with another quartz plate. In the step S3, the sandwiched LCP powder dispersion liquid was irradiated with ultra violet rays until an accumulated quantity of light at a wavelength of 254 nm attained to 2000 mJ with an ultra violet ray irradiation apparatus implemented by a low-pressure mercury lamp from one surface. Ultra violet rays were also emitted from the opposite surface such that the same accumulated quantity of light was attained.

Treated LCP powders were recovered by recovering the LCP powder dispersion liquid from between the synthesized quartz plates, and filtrating and drying the LCP powder dispersion liquid.

Thereafter, as described in the first experimental example, a paste was fabricated by mixing the treated LCP powders with ethanol representing a dispersion medium and kneading the mixture. In addition, a sample was fabricated with this paste as in the first experimental example, and a T-peel test was conducted. FIG. 9 shows results.

Consequently, it was found that T-peel strength was further improved as compared with the case of surface treatment with plasma treatment. Improvement in T-peel strength is nothing but improvement in bonding strength between films. Namely, excellent bonding strength could be confirmed.

(Step of Obtaining LCP Powders)

Figure 18:
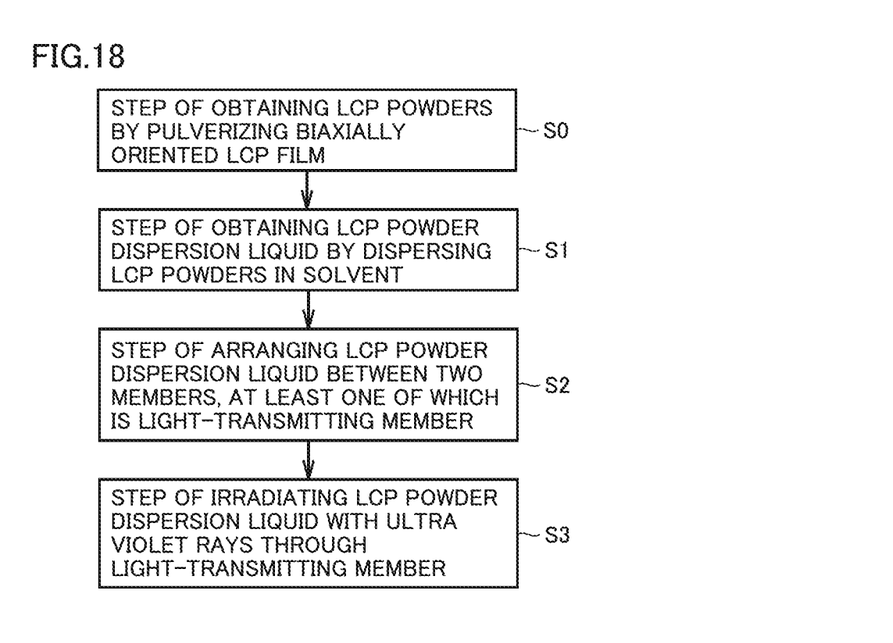
FIG. 18 is a flowchart of an example of the method of manufacturing treated LCP powders in the third embodiment based on the present disclosure.

In the present embodiment, as shown in the flowchart in FIG. 18, a step S0 of obtaining LCP powders by pulverizing a biaxially oriented LCP film may be included before the step S1 of obtaining an LCP powder dispersion liquid. By adopting this method, without preparation of LCP powders in advance, treated LCP powders can be obtained from an LCP film which is readily available. Since a biaxially oriented LCP film is employed, LCP powders in which powdery particles are not fibrous but close to spherical can be obtained. A pulverization apparatus can be employed as appropriate for pulverizing an LCP film.

The step S0 of obtaining LCP powders may be performed by pulverizing an LCP film while it is frozen. By adopting this method, the LCP is pulverized while it is frozen, and hence pulverization is efficient and fine particles can be obtained.

For example, when a uniaxially oriented LCP in a form of pellets is pulverized, the LCP is in a form of elongated fibers and less likely to be powdery, which may not be preferred.

(Formation of Functional Film)

According to treated LCP powders having improved bonding strength according to the present disclosure, a functional film can be formed by mixing other particulate substances. For example, when a layer low in dielectric constant is desired, small hollow spherical objects made of glass may be mixed.

(Third Experimental Example)

Glass bubbles iM30K manufactured by Sumitomo 3M Limited were added to 25 weight %, as small hollow spherical objects made of glass, to an LCP powder dispersion liquid obtained by performing the steps S1 to S3 described in the present embodiment. Thus, ethanol, pure water, the LCP, and glass bubbles are all equal in quantity of 25 weight %. Commercially available glass bubbles iM30K have a 50% particle size of 16 μm and a real density of 0.60 $g/cm^2$. Since the LCP itself has a specific gravity of 1.4 $g/cm^2$, glass bubbles iM30K occupy 50% in weight ratio and approximately 70% in volume ratio in the total solid content including the LCP.

Figure 19:
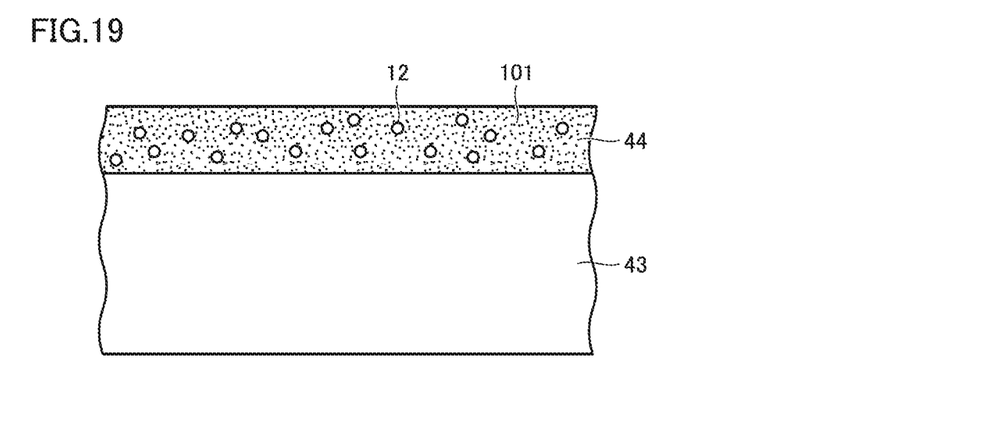
FIG. 19 is a cross-sectional view of an example in which a film is formed on a surface of a base material with the use of treated LCP powders obtained with the method of manufacturing treated LCP powders in the third embodiment based on the present disclosure.

Thereafter, a paste was fabricated by mixing a mixture of the treated LCP powders and glass bubbles iM30K (hereinafter referred to as "small hollow spherical glass objects") with ethanol representing a dispersion medium and kneading the mixture. In addition, a film containing the LCP was formed as shown in FIG. 19 by applying this paste to a surface of a base material. A film 44 is formed on a surface of a base material 43, and film 44 contains treated LCP powders 101 and contains a large number of small hollow spherical glass objects 12.

Consequently, excellent bonding strength was obtained and at the same time, a film with low-dielectric constant could be obtained. When a film with comparably low-dielectric constant is to be obtained only with the LCP, a thickness should be increased. In the case of film 44, however, a film with small thickness but with low dielectric constant can be obtained. With a film with low-dielectric constant, loss is lessened and characteristics in transmission in a high frequency band can be improved.

At the same time, film 44 can also be realized as a film with low-coefficient thermal expansion, which also contributes to improvement in resistance to thermal shock.

Though small hollow spherical glass objects are employed as one example of a filler, the filler is not limited to the small hollow spherical glass objects. Other desired characteristics can also be varied by mixing a filler of another type in treated LCP powders. The treated LCP powders have improved bonding strength. Therefore, even though some kind of filler may be mixed, the treated LCP powders can form a film in a stable manner after the treated LCP powders are applied and pressurized in that state. Whether a dielectric constant is to be raised or lowered or whether a coefficient of thermal expansion is to be raised or lowered, characteristics can be adjusted by selecting an appropriate filler and mixing the filler in an appropriate amount, and a desired functional film can be obtained. This is also applicable to other parameters, without necessarily being limited to a dielectric constant and a coefficient of thermal expansion.

Figure 20:
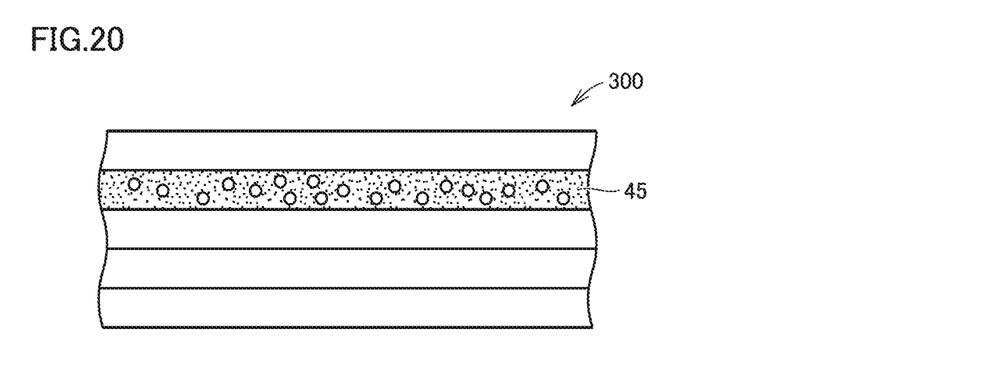
FIG. 20 is a cross-sectional view of an example in which a functional film is interposed in a stack with the use of treated LCP powders obtained with the method of manufacturing treated LCP powders in the third embodiment based on the present disclosure.

In forming a stack of resin layers, as shown in FIG. 20, characteristics of a stack 300 as a whole may also be adjusted by interposing a functional film 45 in which a filler as described above has been mixed, in between intermediate layers as appropriate. Other than one entire layer being implemented as functional film 45, only a two-dimensionally partial region in a specific layer may implement functional film 45.

Figure 21:
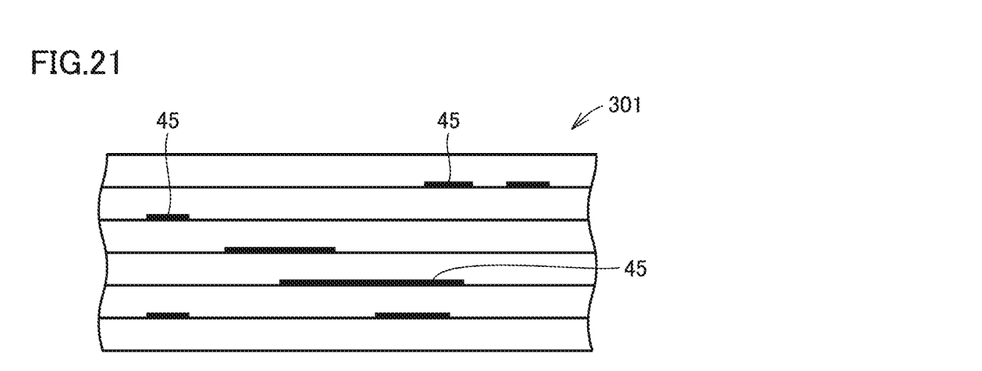
FIG. 21 is a conceptual diagram showing an example of printing in any region of a resin layer in the stack with the use of treated LCP powders obtained with the method of manufacturing treated LCP powders in the third embodiment based on the present disclosure.

When a conductor pattern is arranged on a surface of a resin layer forming a stack and separation of the conductor pattern from an adjacent resin layer gives rise to a problem, functional film 45 in which a filler as described above has been mixed is printed in any region of a resin layer with a conductor pattern in the stack, to thereby suppress interlayer separation. FIG. 21 exemplifies such a construction. Functional film 45 is formed by printing in a partial region of some resin layers in a stack 301.

For example, when a stack is to be fabricated by stacking thermoplastic resin sheets each having various patterns formed on a surface, a thickness of the stack may be insufficient in a two-dimensionally partial region due to presence or absence of a pattern on the surface of each thermoplastic resin sheet, uneven density of a pattern, or presence or absence of a contained component, and consequently, undesired height difference may be caused at the surface of the stack. By applying in advance a paste containing LCP powders based on the present disclosure to the surface of the thermoplastic resin sheet in such a region insufficient in thickness, a thickness of a layer formed with this paste can eliminate the undesired height difference caused at the surface of the stack.

(Other Embodiments)

Though an example in which a resin layer is formed in a stack with a paste containing treated LCP powders 101 has been described in the embodiment above, a paste containing treated LCP powders 101 may be formed into a sheet and the sheet may be used as a single-layer liquid crystal polymer sheet. In that case as well, LCP particles in the paste are likely to bond to each other through plasma treatment or ultra violet ray treatment, so that a liquid crystal polymer sheet can readily be fabricated. In particular, when single-layer functional film 45 described above is to be obtained, functional film 45 containing a specific filler can readily be fabricated. The liquid crystal polymer sheet thus created may be arranged in or stacked on a specific layer in a stack.

Though a resin layer is formed with a paste which is obtained by mixing treated LCP powders 101 in a dispersion medium and kneading the mixture in the embodiment above, a liquid crystal polymer sheet may be obtained by forming treated LCP powders 101 into a sheet through thermocompression bonding without necessarily using a dispersion medium. In that case as well, treated LCP powders 101 are readily bonded to each other through plasma treatment or ultra violet ray treatment, and hence a liquid crystal polymer sheet can readily be fabricated through thermocompression bonding.

As described above, a stack may be constructed to include a liquid crystal polymer sheet obtained by forming treated LCP powders or a paste into a sheet as a resin layer.

The embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present disclosure can be made use of for treated liquid crystal polymer powders, a paste containing the same, and a liquid crystal polymer sheet including the former, a stack, and a method of manufacturing treated liquid crystal polymer powders.

REFERENCE SIGNS LIST

1 LCP powders; 2 plasma; 3 ultra violet rays; 5, 6 dispersion medium; 7 LCP powder dispersion liquid; 8*a*, 8*b* plate; 10 ultra violet light source; 12 small hollow spherical glass objects; 41 first base material; 42 second base material; 43 base material; 44 film; 45 functional film; 51 inner pipe; 51*c*, 52*c* opening; 52 outer pipe; 52*a* supply port; 52*b* exhaust port; 91 longitudinal direction; 101 treated LCP powders; 201 paste; and 300, 301 stack.

The invention claimed is:

1. A method of manufacturing treated liquid crystal polymer powders comprising the steps of:
   obtaining a liquid crystal polymer powder dispersion liquid by dispersing liquid crystal polymer powders in a dispersion medium;
   arranging said liquid crystal polymer powder dispersion liquid between two plates in parallel to each other, at least one of which is a light-transmitting plate; and
   irradiating said liquid crystal polymer powder dispersion liquid with ultra violet rays through said light-transmitting plate.

2. A method of manufacturing treated liquid crystal polymer powders comprising the steps of:
   obtaining a liquid crystal polymer powder dispersion liquid by dispersing liquid crystal polymer powders in a dispersion medium;
   arranging said liquid crystal polymer powder dispersion liquid between an outer pipe and an inner pipe which is arranged in said outer pipe and which comprises a light-transmitting member; and
   irradiating said liquid crystal polymer powder dispersion liquid with ultra violet rays through said inner pipe from inside of said inner pipe.

3. The method of manufacturing treated liquid crystal polymer powders according to claim 1, wherein
   said step of irradiating said liquid crystal polymer powder dispersion liquid with ultra violet rays is performed by emitting the ultra violet rays from a low-pressure mercury lamp or an excimer lamp.

4. The method of manufacturing treated liquid crystal polymer powders according to claim 1, wherein
   said light-transmitting plate is a quartz plate.

5. The method of manufacturing treated liquid crystal polymer powders according to claim 1, comprising the step of obtaining the liquid crystal polymer powders by pulverizing a biaxially oriented liquid crystal polymer film before said step of obtaining a liquid crystal polymer powder dispersion liquid.

6. The method of manufacturing treated liquid crystal polymer powders according to claim 5, wherein
   said step of obtaining the liquid crystal polymer powders is performed by pulverizing said liquid crystal polymer film while the liquid crystal polymer film is frozen.

7. The method of manufacturing treated liquid crystal polymer powders according to claim 2, wherein
   said step of irradiating said liquid crystal polymer powder dispersion liquid with ultra violet rays is performed by emitting the ultra violet rays from a low-pressure mercury lamp or an excimer lamp.

8. The method of manufacturing treated liquid crystal polymer powders according to claim 2, comprising the step of obtaining the liquid crystal polymer powders by pulverizing a biaxially oriented liquid crystal polymer film before said step of obtaining a liquid crystal polymer powder dispersion liquid.

9. The method of manufacturing treated liquid crystal polymer powders according to claim 3, comprising the step of obtaining the liquid crystal polymer powders by pulverizing a biaxially oriented liquid crystal polymer film before said step of obtaining a liquid crystal polymer powder dispersion liquid.

10. The method of manufacturing treated liquid crystal polymer powders according to claim 4, comprising the step of obtaining the liquid crystal polymer powders by pulverizing a biaxially oriented liquid crystal polymer film before said step of obtaining a liquid crystal polymer powder dispersion liquid.

11. A paste comprising:
    the treated liquid crystal polymer powders according to claim 1; and
    a dispersion medium.

12. A paste comprising:
    the treated liquid crystal polymer powders according to claim 2; and
    a dispersion medium.

13. A liquid crystal polymer sheet comprising the treated liquid crystal polymer powders according to claim 1.

14. A liquid crystal polymer sheet comprising the treated liquid crystal polymer powders according to claim 2.

15. A stack comprising the liquid crystal polymer sheet according to claim 13 as a resin layer.

16. A stack comprising the liquid crystal polymer sheet according to claim 14 as a resin layer.

17. A liquid crystal polymer sheet comprising the paste according to claim 11.

18. A liquid crystal polymer sheet comprising the paste according to claim 12.

* * * * *